United States Patent
Hughes et al.

(10) Patent No.: US 8,339,778 B2
(45) Date of Patent: Dec. 25, 2012

(54) ROTATING HARD DRIVE INSTALLATION IN A COMPUTER CHASSIS

(75) Inventors: James E. Hughes, Apex, NC (US); David J. Jensen, Raleigh, NC (US); Pravin S. Patel, Cary, NC (US); Brian A. Trumbo, Apex, NC (US)

(73) Assignee: International Business Machines Corporation, Armonk, NY (US)

( * ) Notice: Subject to any disclaimer, the term of this patent is extended or adjusted under 35 U.S.C. 154(b) by 551 days.

(21) Appl. No.: 12/642,925

(22) Filed: Dec. 21, 2009

(65) Prior Publication Data

US 2011/0149501 A1  Jun. 23, 2011

(51) Int. Cl.
*G06F 1/16* (2006.01)
(52) U.S. Cl. .................................................. 361/679.33
(58) Field of Classification Search ............... 361/679.33
See application file for complete search history.

(56) References Cited

U.S. PATENT DOCUMENTS

| | | | |
|---|---|---|---|
| 5,774,330 A * | 6/1998 | Melton et al. ............ | 361/679.32 |
| 5,808,864 A * | 9/1998 | Jung ........................ | 361/679.32 |
| 6,507,487 B1 * | 1/2003 | Barina et al. ............. | 361/679.33 |
| 6,563,704 B2 | 5/2003 | Grouell et al. | |
| 6,862,172 B2 | 3/2005 | Erickson et al. | |
| 7,123,477 B2 | 10/2006 | Coglitore et al. | |
| 7,319,586 B2 | 1/2008 | Hall et al. | |
| 7,359,188 B2 | 4/2008 | Hall et al. | |
| 7,391,609 B2 | 6/2008 | Hall et al. | |
| 7,414,835 B2 | 8/2008 | Katakura et al. | |
| 7,433,183 B2 * | 10/2008 | Huang ...................... | 361/679.33 |
| 7,502,224 B2 * | 3/2009 | Motoe ....................... | 361/679.33 |
| 7,639,488 B2 * | 12/2009 | Tu ............................. | 361/679.33 |
| 7,643,280 B2 * | 1/2010 | Chen ......................... | 361/679.33 |
| 8,054,620 B2 * | 11/2011 | Roesner et al. .......... | 361/679.33 |
| 2006/0061956 A1 * | 3/2006 | Chen et al. ...................... | 361/685 |
| 2007/0030644 A1 | 2/2007 | Hall et al. | |
| 2007/0058333 A1 * | 3/2007 | Kim .............................. | 361/683 |
| 2008/0137280 A1 * | 6/2008 | Chen et al. ..................... | 361/685 |
| 2008/0304223 A1 | 12/2008 | Franz et al. | |
| 2010/0284141 A1 * | 11/2010 | Baitz et al. ............... | 361/679.33 |

* cited by examiner

*Primary Examiner* — Lisa Lea Edmonds
(74) *Attorney, Agent, or Firm* — Cynthia G. Seal; Jeffrey L. Streets

(57) ABSTRACT

A system comprises a server chassis and first and second hard disk drive carriers, wherein each carrier supports a hard disk drive. A first hinge rotatably connects a distal end of the first hard disk drive carrier to a first side of the chassis, wherein the first hinge allows the carrier to rotate about a first hinge axis between an open position and a closed position. The first hard disk drive carrier rotates in a first plane between an open position extending beyond the front of the chassis and a closed position within the chassis. A second hinge rotatably connects a distal end of the second hard disk drive carrier to a second side of the chassis that opposite the first side of the chassis, wherein the hinge allows the carrier to rotate about a second hinge axis between an open position and a closed position. The second hard disk drive carrier rotates in a second plane between an open position extending beyond the front of the chassis and a closed position within the chassis, wherein the second plane is parallel to the first plane.

10 Claims, 2 Drawing Sheets

ROTATING HARD DRIVE INSTALLATION IN A COMPUTER CHASSIS

BACKGROUND

1. Field of the Invention

The present invention relates to computer disk drives, and more specifically to apparatus for receiving a disk drive in a chassis.

2. Background of the Related Art

Hard disk drives are usually installed within a chassis along with a processor, power supply, memory and various other components of a computer. The high volume of data storage that is possible in a hard disk drive makes it a common component of most computer systems, whether the system is a personal computer, a computer server, or a specialty computer. Still, all of the components in a computer system must be carefully arranged depending upon the form factor of the computer chassis. An appropriate arrangement of the various components must take account of physical space, access to communication buses and power, and adequate air flow through the chassis to cool heat-generating components so that they do not overheat. Often, these and other design considerations are at odds, such that various compromises and accommodations must be made so that the computer system will function at its full capacity.

A blade server chassis, for example, has a narrow form factor that combines a large amount of computer function and capability in a small amount of space. A typical blade server is installing along with several other blade servers in a side-by-side arrangement within a common multi-server chassis. Since the multi-server chassis provides power, cooling fans, network communications and a management controller to each of the blade servers, the blade server form factor can be kept small. However, the compact arrangement of blade server chassis means that only a small portion of each blade server chassis is accessible to a user and exposed to air that can be drawn in to cool the internal components. Accordingly, it is important that the physical arrangement of components does not prevent adequate air flow through the chassis.

BRIEF SUMMARY

One embodiment of the present invention provides a system comprising a server chassis and first and second hard disk drive carriers, wherein each hard disk drive carrier supports a hard disk drive and has a pair of side rails extending along the sides of the hard disk drive to a distal end. A first hinge rotatably connects a distal end of the first hard disk drive carrier to a first side of the chassis, wherein the first hinge allows the carrier to rotate about a first hinge axis between an open position and a closed position. The first hard disk drive carrier rotates in a first plane between an open position extending beyond the front of the chassis and a closed position within the chassis. A second hinge rotatably connects a distal end of the second hard disk drive carrier to a second side of the chassis that opposite the first side of the chassis, wherein the hinge allows the carrier to rotate about a second hinge axis between an open position and a closed position. The second hard disk drive carrier rotates in a second plane between an open position extending beyond the front of the chassis and a closed position within the chassis, and wherein the second plane is parallel to the first plane.

DETAILED DESCRIPTION

One embodiment of the present invention provides a system comprising a server chassis and first and second hard disk drive carriers, wherein each hard disk drive carrier supports a hard disk drive and has a pair of side rails extending along the sides of the hard disk drive to a distal end. A first hinge rotatably connects a distal end of the first hard disk drive carrier to a first side of the chassis, wherein the first hinge allows the carrier to rotate about a first hinge axis between an open position and a closed position. The first hard disk drive carrier rotates in a first plane between an open position extending beyond the front of the chassis and a closed position within the chassis. A second hinge rotatably connects a distal end of the second hard disk drive carrier to a second side of the chassis that opposite the first side of the chassis, wherein the hinge allows the carrier to rotate about a second hinge axis between an open position and a closed position. The second hard disk drive carrier rotates in a second plane between an open position extending beyond the front of the chassis and a closed position within the chassis, and wherein the second plane is parallel to the first plane.

In accordance with one configuration of the foregoing system, the hinged hard disk drive carriers provide optimized placement of the hard disk drives. For example, current blade server systems have a limited amount of space available in the two socket server designs. A processor (CPU) serve blade may have two processors, 24 dual inline memory modules (DIMMs), two hot swap hard drives, two daughter cards, BMC (such as the IBMC available from IBM Corporation of Armonk, N.Y.), 3 to 4 big connectors, and other forms of controller logics. The form factor or size of the blade presents a challenge to cooling with two hot swap spinning hard drives, and achieving the full bus speed of the processor and memory. However, the hard drive configuration of the present invention allows the hard disk drives to be accessible for hot swapping, which maintaining proper air flow and cooling within the chassis so that the system can operate at fully capacity, such as a high data rate for a QuickPath Interconnect (QPI), memory, and Peripheral Component Interconnect Express (PCIe) interface. The rotatable disk drive carriers or housings can be installed into the server without impacting the overall architecture.

Figure 1:
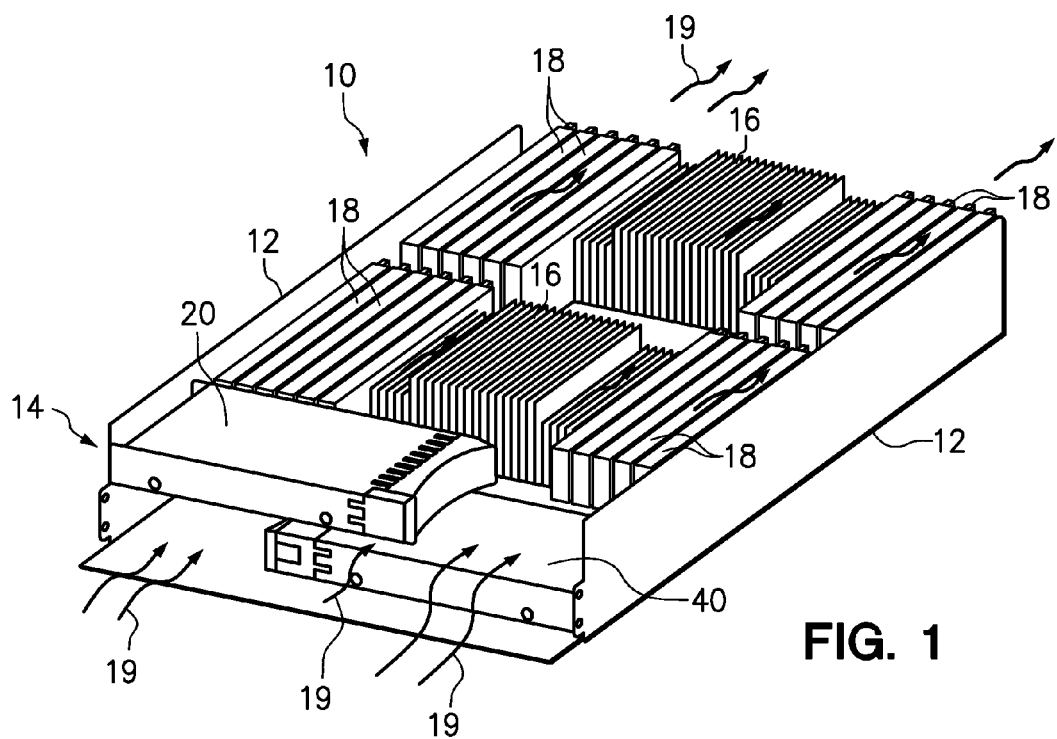
FIG. 1 is a front view of a server chassis having two hard disk drives in the closed position.

FIG. 1 is a perspective view of a system 10 including a server chassis 12 with a top cover removed to show two hard disk drives carriers or enclosures 20, 40 in the closed position within the chassis. The hard disk drive carriers 20, 40 are both rotatably coupled to the chassis 12 near the front face 14. Two heat sinks 16 (secured over two processors that are not shown) and 24 DIMMs 18 are arranged on a printed circuit board, such as a motherboard, behind the two hard disk drive carriers 20, 40. The arrangement of the disk drive carriers 20, 40 provides passages for airflow 19 to move over, under and between the disk drive carriers with adequate flow rates and distribution to cool the heats sinks 16 and DIMMs 18. An air moving device (not shown) may or may not be disposed in the chassis 12. Optionally, the air moving device will be external to the server chassis 12, such as part of a multi-server chassis (not shown), a rack system, or a computer room air conditioning (CRAC) system.

Figure 2:
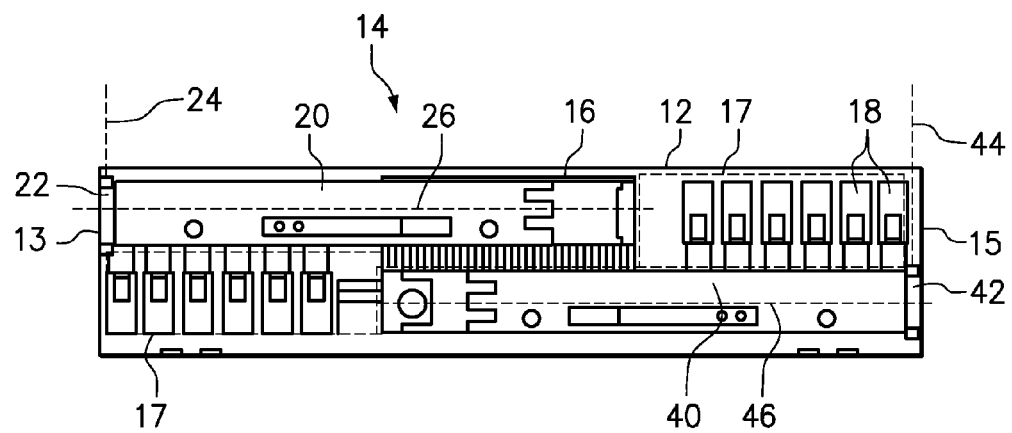
FIG. 2 is a top view of the server chassis with the one of the two hard disk drives rotated intermediate between the closed position and an open position.

FIG. 2 is a front view of the server chassis 12 with any optional front grill removed to show the two hard disk drive carriers 20, 40 in their closed positions within the chassis. The first hard disk drive carrier 20 is rotatably secured to the left side wall 13 of the chassis 12 by a hinge 22 that rotates about an axis 24 and secures the hard disk drive carrier 20 in a horizontal position with a centerline through the carrier 20 that lies along a first plane 26. By contrast, the second hard disk drive carrier 40 is rotatably secured to the right side wall 15 of the chassis 12 by a hinge 42 that rotates about an axis 44 and secures the hard disk drive carrier 40 in a horizontal position with a centerline through the carrier 40 that lies along a second plane 46. Preferably, both of the hinges 22, 42 are secured adjacent the front face 14 of the chassis.

As shown, the two hard disk drive carriers 20, 40 lie along the parallel planes 26, 46 and overlap each other when both are in their closed positions. Although air flow may find its way around all sides of the carriers 20, 40, The majority of air flow through the front face 14 of the chassis 12 will pass through the airflow region 17 (shown outlines with a dashed line). The airflow region 17 extends across the front 14 of the chassis 12 from the left side 13 to the right side 15 so that the carriers do not starve any of the downstream components (16, 18) of airflow. Specifically, the airflow region 17 includes a first portion below the first carrier 20 and to the left of the second carrier 40, a second portion between the overlapping region of the first and second carriers 20, 40, and a third portion above the second carrier 40 and to the right of the first carrier 20.

Figure 3:
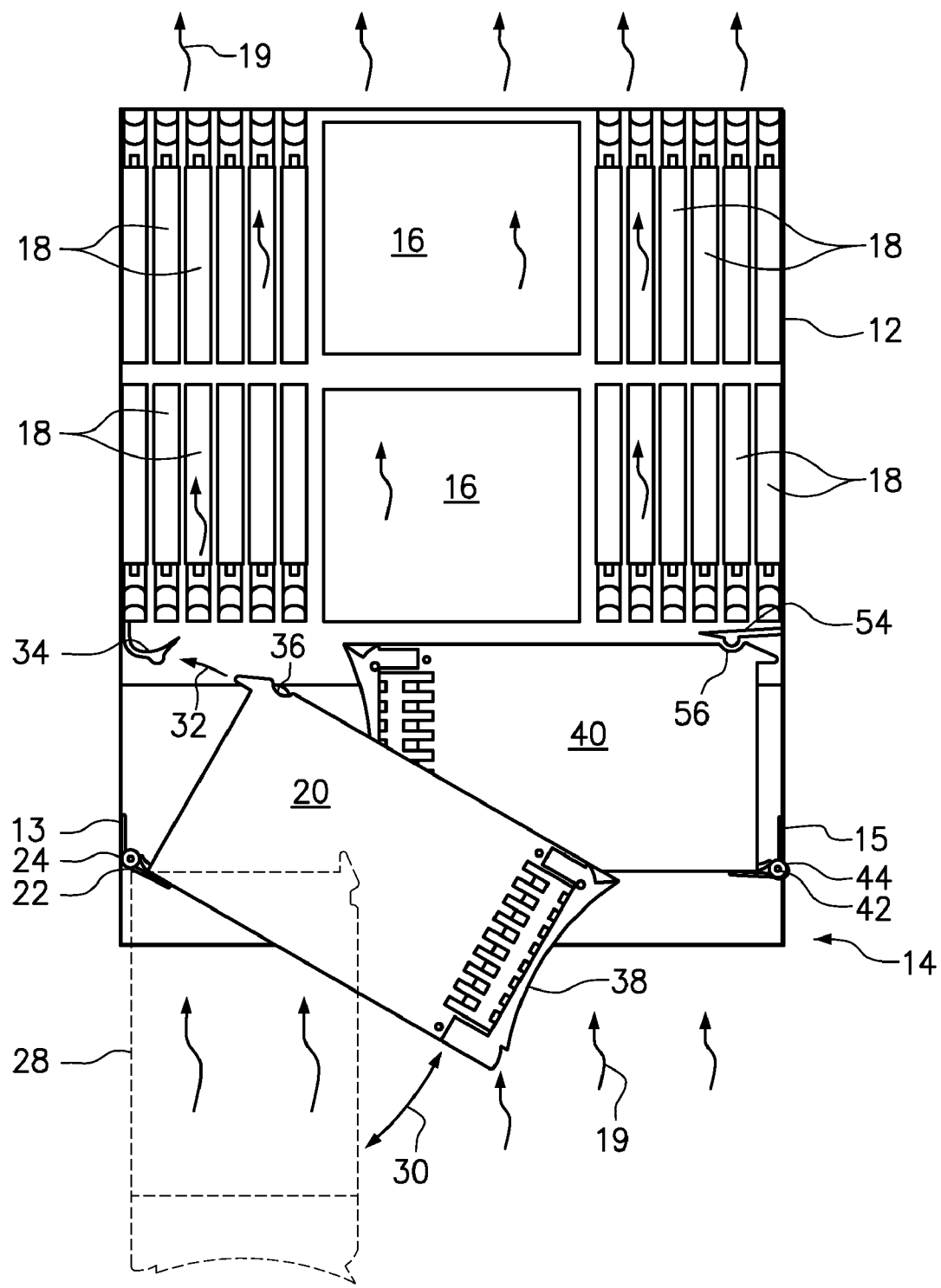
FIG. 3 is a perspective view of the server chassis with the two hard disk drives in the closed position.

FIG. 3 is a top view of the server chassis 12 with the first hard disk drive and carrier 20 rotated intermediate between the closed position (See FIGS. 1 and 2) and an open position (See dashed outline 28). The carrier 20 rotates about the axis 24 of the hinge 22 in the direction of the arrow 30. In the open position 28, the hard disk drive may be hot swapped, such as by pulling the latch 38 outward to remove the hard drive. Alternatively, when the carrier 20 is being closed in the direction of arrow 32, a detent 34 is aligned to engage a recess 36 in the carrier 20 and hold the carrier 20 in the closed position. Carrier 40 is shown in the closed position with the detent 54 engaged in the recess 56. The detents 34, 54 may take various forms, such as a catch, dog or spring loaded ball, in order to be releasable by manual force. Alternatively, other types of mechanical devices may be used to selectively secure the carriers in their closed positions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, components and/or groups, but do not preclude the presence or addition of one or more other features, integers, steps, operations, elements, components, and/or groups thereof. The terms "preferably," "preferred," "prefer," "optionally," "may," and similar terms are used to indicate that an item, condition or step being referred to is an optional (not required) feature of the invention.

The corresponding structures, materials, acts, and equivalents of all means or steps plus function elements in the claims below are intended to include any structure, material, or act for performing the function in combination with other claimed elements as specifically claimed. The description of the present invention has been presented for purposes of illustration and description, but it is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. An apparatus comprising:
   a server chassis;
   first and second hard disk drive carriers, each hard disk drive carrier supporting a hard disk drive and having a pair of side rails extending along the sides of the hard disk drive to a distal end;
   a first hinge rotatably connecting a distal end of the first hard disk drive carrier to a first side of the chassis, wherein the hinge allows the carrier to rotate about a first hinge axis between an open position and a closed position;
   a second hinge rotatably connecting a distal end of the second hard disk drive carrier to a second side of the chassis that opposite the first side of the chassis, wherein the hinge allows the carrier to rotate about a second hinge axis between an open position and a closed position; and
   wherein the first hard disk drive carrier rotates in a first plane between an open position extending beyond the front of the chassis and a closed position within the chassis, and wherein the second hard disk drive carrier rotates in a second plane between an open position extending beyond the front of the chassis and a closed position within the chassis, and wherein the second plane is parallel to the first plane.

2. The apparatus of claim 1, wherein the first and second hinges are secured to the chassis adjacent a front plane of the chassis.

3. The apparatus of claim 1, wherein the first and second hard disk drive carriers overlap when both the first and second hard disk drive carriers are in the closed positions.

4. The apparatus of claim 1, wherein the neither of the first and second disk drive carriers extends fully across the width of the chassis when the first and second hard disk drive carriers are in the closed positions.

5. The apparatus of claim 4, wherein the first plane is above the second plane, wherein a first airflow passage is provided below the first hard disk drive carrier and opposite the second hard disk drive carrier when both the first and second hard disk drive carriers are in the closed positions, and wherein a second airflow passage is provided above the second hard disk drive carrier and opposite the first hard disk drive carrier when both the first and second hard disk drive carriers are in the closed positions.

6. The apparatus of claim 3, where the first and second planes are sufficiently spaced apart to provide an airflow passage between the first and second hard disk drive carriers when both the first and second hard disk drive carriers are in the closed positions.

7. The apparatus of claim 1, wherein the server chassis houses a motherboard behind the first and second hard disk drive carriers when both the first and second hard disk drive carriers are in the closed positions.

8. The apparatus of claim 7, wherein the motherboard includes two processors.

9. The apparatus of claim 1, wherein the server chassis is a server blade.

10. The apparatus of claim 9, wherein the server blade is a two socket server.

* * * * *